United States Patent [19]

Aziz

[11] 3,900,894

[45] Aug. 19, 1975

[54] WRITE-ERASE CIRCUITS FOR ROTATING HEAD DIGITAL MAGNETIC RECORDERS

[75] Inventor: Rahmat A. Aziz, Boulder, Colo.

[73] Assignee: International Business Machines Corporation, Armonk, N.Y.

[22] Filed: Oct. 31, 1974

[21] Appl. No.: 519,740

[52] U.S. Cl. .................... 360/108; 360/66; 360/84

[51] Int. Cl.$^2$... G11B 5/09; G11B 5/47; G11B 5/52; G11B 15/12

[58] Field of Search ............ 360/108, 84, 107, 101, 360/66, 123, 130, 118; 335/236

[56] References Cited

UNITED STATES PATENTS

| | | | |
|---|---|---|---|
| 3,042,756 | 7/1962 | Buslik | 360/84 |
| 3,361,878 | 1/1968 | Patterson et al. | 360/108 |
| 3,536,856 | 10/1970 | Kietz et al. | 178/6.6 A |

OTHER PUBLICATIONS

IBM Technical Disclosure Bulletin, Buslik, Transformer Rotating Head, Vol. 13, No. 10, March 1971, page 3076.

*Primary Examiner*—Alfred H. Eddleman

*Attorney, Agent, or Firm*—Herbert F. Somermeyer

[57] ABSTRACT

A center tapped rotating transformer is connected through isolation diodes to a center tapped recording winding. An erase winding is connected between a center tapped rotating transformer and a center tap of the recording winding for providing an erase current whenever recording occurs.

8 Claims, 2 Drawing Figures

WRITE-ERASE CIRCUITS FOR ROTATING HEAD DIGITAL MAGNETIC RECORDERS

BACKGROUND OF THE INVENTION

The present invention relates to rotating head magnetic recorders, particularly to those recorders capable of recording digital type signals. Rotating digital signal recorders have been employed as well as so-called video type. For example, Buslik in U.S. Pat. No. 3,042,756, particularly in FIG. 7, shows a rotating transformer connection for use in the rotating head magnetic recorder at lower digital signal densities, for example up to 5,000 flux changes per inch, a signal can be recorded over previous recordings to yield a satisfactory magnetic record. That is, the signal is capable of substantially completely obliterating previous recordings whenever a new recording is desired. However, as frequencies are increased, hence, the recording densities are increased, such overwriting or overrecording does not always result in a new satisfactory recording. Accordingly, at higher signal densities it is necessary to provide an erase function preceding the recording function. This can be done using a single gap and two revolutions of the head carrying rotor. For example, during the first revolution the recording could be erased and during the second revolution signals are recorded. This serial operation is time consuming. Particularly in those apparatus connected to digital computers, time becomes very important, accordingly, it is desired to erase and record during the same rotation of a rotating head.

In providing an erase function, in addition to a signal transformer rotating erase transformer may be required. This second transformer adds substantial cost to the magnetic recorder. In view of the fact of the intense competition in the rotating head recorders, it is highly desirable that the cost of the recorder be minimized, that is the erase function should be provided without the addition of a second rotating transformer and without providing DC current on the rotor separate from recording circuits.

SUMMARY OF THE INVENTION

It is an object of the invention to provide a low-cost erase before record rotating head digital signal recorder using only a single rotating transformer for both functions.

Apparatus of employing the present invention envisions a center-tap rotating transformer having both a center-tapped primary winding and a center-tapped secondary winding. A center-tapped recording coil is provided with an erase coil connected between the center taps of the secondary winding and of the recording coil. A pair of isolation diodes are disposed between the ends of the secondary and the record coil. When continuously recording digital signals, recording current is switched between halves of the center-tapped recording winding resulting a substantially constant current flowing through the erase winding for providing the erase function. Any coding scheme may be used with the invention, it being preferred that a zero or balanced DC modulation scheme be employed, such as shown in U.S. Pat. No. 3,810,111.

The foregoing and other objects, features and advantages of the invention will be apparent from the following more particular description of preferred embodiments of the invention, as illustrated in the accompanying drawing.

THE DRAWING

DETAILED DESCRIPTION

Figure 1:
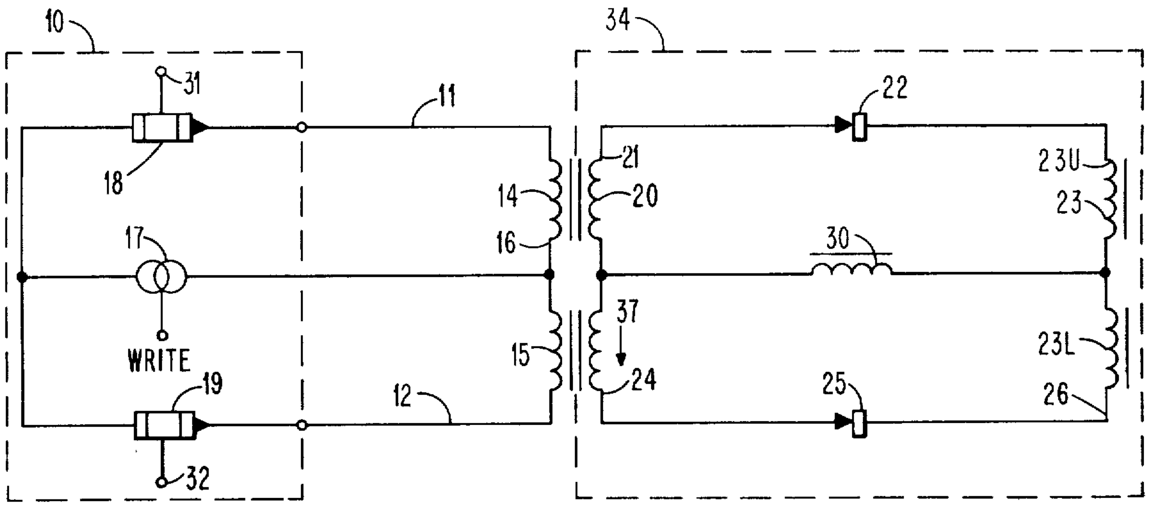
FIG. 1 is a diagram showing a circuit arrangement of the present invention.
Figure 2:
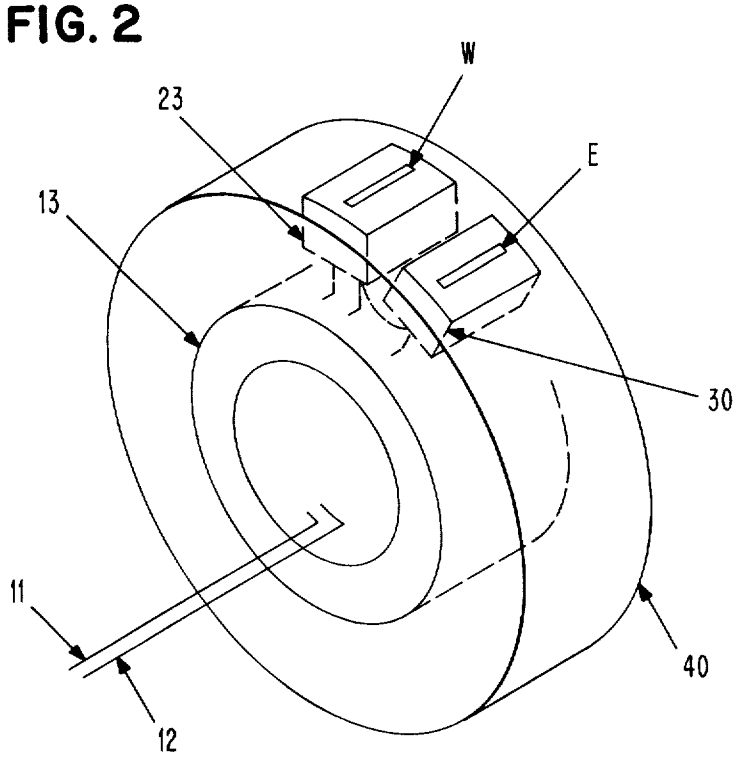
FIG. 2 is a simplified diagrammatic showing of a rotating transformer with electrical connections to erase and write heads to implement the FIG. 1 illustrated circuit.

Referring to the drawing, a preferred embodiment of the present invention includes a write or recording driver 10 having differential outputs supplied over lines 11 and 12 to a center-tapped primary winding 13 having an upper half 14 and lower half 15. The center tap at 16 is connected to one end of a current source 17. The other end of the current source supplies two switching transistors 18 and 19 with a constant current to be differentially switched between lines 11 and 12 as is well known in the art. The rotating transformer preferably has an iron core for efficient signal transfer. The transformer also has a center-tapped secondary winding 20 having a first end 21 connected through an isolating diode 22 to one end of a center-tapped recording coil 23. The other end 24 of center-tapped secondary winding 20, is likewise connected through isolating diode 25 to an opposite end 26 of center-tapped recording winding 23. An erase coil 30 is connected between the center taps of the recording winding 23 and secondary winding 20.

During a recording operation, current source 17 continuously supplies constant current to transistors 18/19. Depending upon the data input at terminals 31 and 32 (differentially received), the substantially constant current is either supplied over line 11 or line 12 to primary winding 13. Through transformer action, this current is transferred to the rotating members indicated within dash box 34 which may be constructed much as shown in Buslik U.S. Pat. No. 3,042,756. When current is flowing down in the direction of arrow 36 through winding 13 a similar flowing current is induced in secondary winding 20 represented by arrow 37. In this instance, the full current from source 17 flows through diode 25 in the lower half 23L of recording coil 23 then through erase coil 30 to the center tap of secondary 20. When the data is switched such that current is flowing now through over line 12 and none over line 11 oppositely flowing current is induced in secondary winding 20. In this instance such current flows through diode 22 down through the upper half of 23U recording coil 23 thence through erase coil 30 to the center tap of secondary winding 20. Note that even though the write current has been selectively reversed in the recording coil 23, the current amplitude and the current magnitude is always in the erase coil 30 so long as constant current source 17 is supplied its current.

Physically the rotating transformer 13 can be on the inner side of a rotating wheel 40 to be inserted into a rotating head digital signal recorder such as shown in Buslik, supra. Erase gap E precedes the record gap W such that the coil 30 supplies erasing flux to the magnetic medium (not shown) for erasing the medium disk prior to recording through gap W. The recording coil 23 and erase coil 30 are respectively mounted on magnetic pole pieces (not shown) which cooperate with gaps W and E, respectively, to complete a transducer as is known in the art. Since such transducer construction is so well known in the art, the details of such transducers are omitted for brevity.

From the above description it is seen that there is provided a DC erase current without power on the rotor for erasing by utilizing the write current. Also, because of the inductance provided by erase coil 30 in the center leg of the write coils, write current rise time is enhanced, i.e., reduced.

While the invention has been particularly shown and described with reference to a preferred embodiment thereof, it will be understood by those skilled in the art that various changes in form and details may be made therein without departing from the spirit and scope of the invention.

What is claimed is:

1. For use in a rotating head signal recorder:

an improved write-erase apparatus including in combination:

a rotating transformer having a stationary center-tapped primary winding, and a rotatable center-tapped secondary winding magnetic coupled to said center-tapped primary winding, a center-tapped recording coil for a recording head having its opposite ends respectively connected to ends of said secondary winding and mounted for rotation therewith, and an erase coil element electrically interconnected between the center taps of said secondary winding and said recording coil.

2. The apparatus set forth in claim 1 further including an erase gap and a write gap, the erase gap being upstream with respect to a record medium to be recorded from said write gap, and being magnetically coupled to said erase coil and said write gap being magnetically coupled to said write coil.

3. The apparatus set forth in claim 1 further including an isolating diode electrically interposed respectively between ends of said secondary winding and said write coil.

4. The apparatus set forth in claim 3 further including a constant current source, first and second switching transistors having one end connected to said constant current source, and the second end respectively connected to the opposite ends of said center-tapped primary winding, and said constant current source being connected to the center tap of said primary winding.

5. A circuit for providing erase while record functions in a rotating head transformer coupled signal recorder, the improvement including in combination:

a rotatable element for use in a digital signal magnetic recorder, a secondary winding on said rotatable element having a first and second end and a center-tap connection, a write gap on said rotating element, a center-tapped recording coil having first and second ends and a center-tap connection magnetically coupled to said write gap, an erase gap, an erase coil magnetically coupled to said erase gap having first and second ends, first end of secondary winding and of said write coil being electrically connected together, the secondary ends of said primary end said write coil being electrically connected together, and the erase coil being electrically connected between said center taps.

6. The circuit set forth in claim 5 further including unidirectional current conducting means electrically interposed between the first ends and said second ends and poled to conduct current in opposite directions through said recording coil such that said erase coil always receives the same direction electrical current between said secondary winding center-tap connection and said center-tap connection of said recording coil.

7. The apparatus set forth in claim 6 further including a stationary primary winding disposed in magnetic coupling relationship to said secondary winding and having a first and second end and a center-tap connection.

8. Circuit set forth in claim 7 further including first and second switching transistors, including differential control signal receiving means, and having a first connection to said first and second ends of said primary winding and having a second connection, which is common, and a constant current source connected between the common connection and said center-tap connection of said primary winding and a control connection to said constant current source.

* * * * *